3,134,640

United States Patent Office

Patented May 26, 1964

3,134,640
PREPARATION OF CHROMIUM OXYCHLORIDE, CrOCl
Frank W. Hengeveld and Kirman Taylor, Painesville, Ohio, assignors to Diamond Alkali Company, Cleveland, Ohio, a corporation of Delaware
No Drawing. Filed June 8, 1961, Ser. No. 115,786
3 Claims. (Cl. 23—85)

This invention relates to a new and improved process for the preparation of chromium oxyhalides, and more particularly to a new and improved process for the preparation of chromium (III) oxyhalides of the formula CrOX, wherein X is halogen.

A substance represented by the formula $Cr_2O_3 \cdot CrCl_3$, or CrOCl, is reported in Mellor's Comprehensive Treatise on Inorganic and Theoretical Chemistry, vol. XI, p. 391. It was obtained by heating chromium (III) chloride hexahydrate at red heat. At that time, it was not established whether the material was a true chemical compound of constant composition or merely a mixture of chromium oxides and chlorides.

An object of this invention, therefore, is to prepare chromium (III) oxyhalides as chemical entities of definite composition.

A further object is to provide an economical method for preparing chromium (III) oxyhalides in a state of substantially high purity.

These and other objects will become apparent to those skilled in the art upon reading the description of the invention which follows.

The present invention is directed to the process of preparing a compound of the formula CrOX, wherein X is a halogen, which comprises reacting a compound of the formula $CrX_3$ with oxygen. Commercial oxygen is conveniently used; however, air may also be employed as an oxygen source.

The reaction may be carried out by passing air or oxygen through solid anhydrous chromium (III) halide, the latter being heated to a temperature of about 200°–500° C., preferably 300°–450° C. Oxygen may be fed to the chromium halide at any convenient rate, typically about 5–15 liters per hour. The time required for substantially complete conversion to chromium oxyhalide is usually from three to five hours, and is best determined by observation. If too much oxygen is used, the characteristic green color of chromium (III) oxide, $Cr_2O_3$, appears in the product. Reaction rate and extent of product formation are dependent upon the particle size of the chromium (III) halide; a material of small particle size is more completely converted to oxyhalide in a shorter time than is a material of larger particle size.

Alternatively, the reaction may be carried out by passing a mixture of oxygen and an inert gas, e.g., helium or nitrogen, through a bed of chromium (III) halide. The same conditions of temperature, time and addition rate apply.

When, for example, chromium (III) chloride is reacted with oxygen by the method set forth hereinabove, the product, chromium (III) oxychloride, is obtained as a gray powder with a bulk density of about 0.02–0.5 g. per cc., depending on the bulk density of the chromium (III) chloride used. The compound is in the form of hair-like crystals. X-ray diffraction data show that the crystalline structure of chromium (III) oxychloride is distinctly different from those of $Cr_2O_3$ and $CrCl_3$.

The high surface area of chromium (III) oxychloride suggests utility as a catalyst, catalyst support, thermal insulator, and filler for plastics, rubber and the like. In the presence of aluminum alkyls, it has been shown to be an effective catalyst for the polymerization of olefins.

In order that those skilled in the art may more completely understand the present invention and the preferred methods by which the same may be carried into effect, the following specific examples may be offered:

EXAMPLE I

*Preparation of Chromium (III) Oxychloride*

A 2-liter, 3-necked, round-bottomed flask is fitted with a mechanical stirrer and gas inlet and exit tubes. The flask is half filled with anhydrous chromic chloride and is heated with a heating mantle until the surface of the flask has reached a temperature of 450° C. The chromic chloride is slowly agitated as oxygen is fed to the reactor for 3½ hours at a rate of 6 to 10 liters per hour. After 30 minutes of reaction, the flask is filled with a reddish brown gas, probably chromyl chloride. At the end of the reaction, essentially all of the chromic chloride has been converted to gray crystals of chromium (III) oxychloride.

Elemental analysis of the product indicates an atomic ratio of 1:1:1 for chromium, oxygen and chlorine. The line spacings in the X-ray powder patterns for the product of this example and the known oxides and chlorides of chromium are markedly different, thus proving the existence of CrOCl as a distinct chemical species.

EXAMPLE II

*Part A.—Homopolymerization*

Polymerizations of ethylene, propylene, and ethylene-propylene mixtures are carried out in 7-oz. bottles. The bottle is charged with 100 ml. of heptane and 1 millimole of chromium (III) oxychloride and then sealed. Two millimoles of triisobutyl aluminum in dilute solution is then injected into the bottle by means of a hypodermic syringe. The monomer (ethylene, propylene, or a 1:4 molar ratio of ethylene to propylene) is then charged to the bottle to a total monomer pressure of 50 p.s.i. The polymerization is allowed to continue for 24 hours at 25° C., followed by 72 hours at 75° C. The results of this experiment are shown in the following table.

| Monomer | 24 hrs. @ 25° C. | 72 hrs. @ 75° C. |
|---|---|---|
| Ethylene | 3 p | 3 ps |
| Propylene | 2 p | 2 p |
| Ethylene: propylene (1:4) | 3 ps | 3 ps |

Code: 0—no polymerization; 1—traces of polymer; 2—yield about 0.1 g.; 3—yield about 1 g.; 4—yield about 3 g.; p—polymerization on solid particles; s—polymerization in solution.

*Part B.—Copolymerization*

Ethylene and propylene (1:4 molar ratio) are copolymerized in the presence of a chromium oxychloride-triisobutyl-aluminum catalyst. The polymerization is carried out according to the procedure described in Part A. In a 30-ounce bottle are placed 600 cc. of heptane, 2 millimoles of chromium oxychloride, and the required amount of triisobutylaluminum to give the molar ratio designated in the table below. The bottle is then charged with a 1:4 mixture of ethylene and propylene to a monomer pressure of 50 p.s.i. and polymerization is allowed to take place for 12 hours at 70° C. The results are given below.

Molar ratio, $Al(i\text{-}Bu)_3$:CrOCl:     Yield
  1.5:1 ---------------------------------- 3
  2:1 ------------------------------------ 3
  3:1 ------------------------------------ 4
  5:1 ------------------------------------ 4
  10:1 ----------------------------------- 4

It is to be understood that although the invention has been described with specific reference to particular embodiments thereof, it is not to be so limited, since changes

What is claimed is:

1. The process of preparing chromium oxychloride having the formula CrOCl, which comprises reacting chromic chloride with oxygen for about three to five hours, with agitation, at a temperature of about 200° to 500° C. and recovering the chromium oxychloride.

2. The process of preparing chromium oxychloride having the formula CrOCl, which comprises reacting chromic chloride with oxygen at a temperature of about 300° to 450° C. for a period of about three to five hours, with agitation, and recovering the chromium oxychloride.

3. The process of preparing chromium oxychloride having the formula CrOCl, which comprises heating anhydrous chromic chloride to a temperature of about 200° to 500° C., with agitation, introducing oxygen for a period of about three to five hours at a rate of about 5 to 15 liters per hour and recovering the chromium oxychloride.

References Cited in the file of this patent

UNITED STATES PATENTS

| | | |
|---|---|---|
| 2,684,284 | Grosse | July 20, 1954 |
| 2,793,937 | East | May 28, 1957 |
| 2,935,495 | Kennedy | May 3, 1960 |
| 2,942,944 | Wilhelm | June 28, 1960 |
| 2,943,081 | Howard | June 28, 1960 |

FOREIGN PATENTS

| | | |
|---|---|---|
| 552,983 | Canada | Feb. 11, 1958 |

OTHER REFERENCES

Mellor: Comprehensive Treatise on Inorganic and Theoretical Chemistry, vol. 11, pages 391–2 (1931). Longmans, Green & Company, New York.

Jacobson's "Encyclopedia of Chemical Reaction," vol. 2, 1948 Edition, page 748 (Eq. II 2960). Reinhold Pub. Corp., New York.

Chemical Reviews, vol. 58, No. 1, pages 4–8 (February 1958).